United States Patent
Papi et al.

(10) Patent No.: US 7,743,559 B2
(45) Date of Patent: Jun. 29, 2010

(54) MODULAR SUPPORT FOR AUTOMOBILE DOORS, DOOR ASSEMBLY FOR AN AUTOMOBILE AND METHOD FOR MOUNTING THE MODULAR SUPPORT ON A DOOR FRAME

(75) Inventors: Frederic Papi, Troy, MI (US); John Stickney, Rochester, MI (US); Andreas Schmidt, Sterling Heights, MI (US)

(73) Assignee: Grupo Antolin-Ingenieria S.A. (ES)

( * ) Notice: Subject to any disclaimer, the term of this patent is extended or adjusted under 35 U.S.C. 154(b) by 932 days.

(21) Appl. No.: 11/370,299

(22) Filed: Mar. 8, 2006

(65) Prior Publication Data
US 2006/0283091 A1 Dec. 21, 2006

(30) Foreign Application Priority Data
Jun. 16, 2005 (EP) .................................. 05380129

(51) Int. Cl.
*B60J 5/04* (2006.01)
(52) U.S. Cl. ........................................................ 49/502
(58) Field of Classification Search .................. 49/212, 49/502; 296/146.5
See application file for complete search history.

(56) References Cited

U.S. PATENT DOCUMENTS

| 4,648,208 | A | * | 3/1987 | Baldamus et al. | 49/502 |
| 5,529,370 | A | * | 6/1996 | Veit | 296/146.7 |
| 5,694,719 | A | * | 12/1997 | Bejune et al. | 49/502 |
| 5,927,021 | A | * | 7/1999 | Kowalski et al. | 49/502 |
| 5,960,588 | A | * | 10/1999 | Wurm et al. | 49/352 |
| 6,029,403 | A | * | 2/2000 | Bertolini et al. | 49/502 |
| 6,381,906 | B1 | * | 5/2002 | Pacella et al. | 49/502 |
| 6,425,208 | B1 | * | 7/2002 | Klueger et al. | 49/502 |
| 6,571,515 | B1 | * | 6/2003 | Samways et al. | 49/502 |
| 6,594,955 | B1 | * | 7/2003 | Delire et al. | 49/502 |
| 6,676,324 | B1 | * | 1/2004 | Pleiss | 403/33 |
| 6,684,568 | B2 | * | 2/2004 | Blume et al. | 49/349 |
| 6,698,140 | B2 | * | 3/2004 | Tatsumi et al. | 49/502 |
| 6,817,804 | B2 | * | 11/2004 | Le Gallo et al. | 403/408.1 |
| 7,059,659 | B2 | * | 6/2006 | Smith et al. | 296/146.7 |
| 7,100,330 | B2 | * | 9/2006 | Reul et al. | 49/502 |
| 7,198,319 | B2 | * | 4/2007 | Schroder et al. | 296/146.7 |
| 7,246,465 | B2 | * | 7/2007 | Staser | 49/502 |
| 2002/0066232 | A1 | * | 6/2002 | Tatsumi et al. | 49/502 |
| 2003/0009948 | A1 | * | 1/2003 | Nishikawa et al. | 49/502 |
| 2005/0115155 | A1 | * | 6/2005 | Ottino et al. | 49/502 |

(Continued)

FOREIGN PATENT DOCUMENTS

DE     3304569 C1 *  7/1984

(Continued)

*Primary Examiner*—Jerry Redman
(74) *Attorney, Agent, or Firm*—Ostrolenk Faber LLP

(57) ABSTRACT

The present disclosure relates to a modular support for automobile doors, which includes a support panel and at least one attachment unit to attach the panel to a frame. The attachment unit includes an orifice made in the panel; a screw; a nut in which the screw is threaded; and a guide element that allows the nut to move in a direction parallel to a longitudinal axis of the screw which stops the nut from turning about said longitudinal axis of the screw. The present disclosure also relates to a door assembly and an assembly method.

15 Claims, 8 Drawing Sheets

U.S. PATENT DOCUMENTS

| | | | |
|---|---|---|---|
| 2007/0017159 A1* | 1/2007 | Moore | 49/502 |
| 2007/0101658 A1* | 5/2007 | Heyer | 49/502 |
| 2007/0145769 A1* | 6/2007 | Nakashita et al. | 296/146.5 |
| 2008/0116722 A1* | 5/2008 | Garcia Martin et al. | 296/208 |
| 2008/0141592 A1* | 6/2008 | Nakajima | 49/502 |
| 2008/0148647 A1* | 6/2008 | Pavlovic | 49/502 |

FOREIGN PATENT DOCUMENTS

| | | | |
|---|---|---|---|
| DE | 3608506 A1 | * | 11/1987 |
| EP | A1498294 | | 1/2005 |

* cited by examiner

MODULAR SUPPORT FOR AUTOMOBILE DOORS, DOOR ASSEMBLY FOR AN AUTOMOBILE AND METHOD FOR MOUNTING THE MODULAR SUPPORT ON A DOOR FRAME

CROSS REFERENCE TO RELATED APPLICATIONS

This application claims the benefit of the European Patent Application No. 05380129.6 filed on 16 Jun. 2005, which is hereby incorporated by reference.

TECHNICAL FIELD OF THE INVENTION

The invention belongs to the field of doors for automobiles, and more specifically to the field of modular door systems.

BACKGROUND OF THE INVENTION

The current trend in the automobile manufacturing sector is to group components to obtain modular systems that simplify and facilitate their mounting by allowing to mount an assembly instead of individual elements separately.

One example of this type of modular systems is that comprised of a support or panel normally made of plastic (although it can also be metallic) in which several accessories or functional components of the door are pre-mounted, such as elements of the window lift, the lock, impact absorption systems, loudspeakers, etc.

In addition, this type of modular supports can provide a watertight seal, in which case the panel or modular support can separate a dry area (located towards the inside of the vehicle, in which the electrical and electronic components sensitive to dust and moisture are placed) from a wet area located towards the inside of the door box (in which, for example, the window lift guides are placed).

This type of panels do not incorporate the pre-mounted lining that the user will see from inside the vehicle and which provides the end finish to the door. This lining will be mounted in a later stage.

This type of door modules have been conceived to facilitate the final assembly of the product in the assembly lines and to reduce the assembly times. Therefore, the use of this type of modular support simplifies the assembly of the functional components, as these components are pre-mounted on a singe panel or modular support that can be mounted on a door frame in a single assembly stage.

European Patent application no. EP-A-1498294 describes an assembly system for a door module (with trimming) in which the window lift guides are pre-mounted, so that the lower ends of said guides are located inside the door box. To facilitate this mounting a separation is maintained between the module and the window lift rail, which is obtained by interposing a metal strip between the module and the rail. This strip is mounted on the screw used to attach the module and the rail to the door structure. The screw is pre-mounted on the module. To allow assembling the module with the pre-mounted screws, the structure or frame of the door is provided with a recess that allows assembling the module, such that the window lift rail can be placed in the inner part of the door box.

The system described in EP-A-1498294 is quite complex (it includes the aforementioned strip, screws welded to the guides, etc.) and although it may be suitable for the specific application described in said document, it may not be ideally suited to other applications.

Therefore, the need appears to exist for an attachment system that allows a simple assembly of modular supports on vehicle door frames, which is simple and comprises a small number of moving parts.

DESCRIPTION OF THE INVENTION

A first aspect of the invention relates to a modular support for automobile doors which comprises:

A support element or support panel, configured for assembling accessories of an automobile door on said panel, such as elements corresponding to the door lock, window lift guides and/or other elements of the window lift, speakers, a peripheral watertightness gasket, etc.); and At least one attachment unit (normally a plurality of said attachment units; for example, the modular support may comprise a plurality of attachment units arranged about the perimeter of the panel) for attaching the panel to a door frame.

According to the invention, said at least one attachment unit comprises:
  an orifice made in the panel;
  a screw mounted on said panel, passing through the orifice, this screw having a head placed on a first side of the orifice;
  a nut placed on a second side of the orifice (this second side being the side opposite to the first side of the orifice), the screw being threaded in the nut (so that when the screw is turned the nut moves along the longitudinal axis of the screw); and
  a guide element that extends from a surface of the panel that is even with said second side of the orifice (opposite to the first side of the orifice), said guide element being functionally associated to the nut such that it allows moving the nut in a direction parallel to a longitudinal axis of the screw and so that it prevents turning the nut around said longitudinal axis of the screw.

In this way, the attachment unit including the screw and the nut can be pre-mounted on the panel, the screw being retained by the nut and vice versa, so that the screw and the nut cannot be accidentally separated from the panel. In addition, the guide element prevents the nut from turning about the screw axis, so that the worker does not have to hold the nut during the process of mounting the support on a door frame; the worker only has to place the attachment units at the correct areas of the door frame and then turn the screws, as the guide elements stop the nuts from turning. Turning the screws in the correct sense will bring together each nut and the corresponding screw head, therefore bringing together the nut and the panel surface. Therefore, these attachment units, which require only two moving elements (as the orifice and the guide element can form part of the panel), allow a simple assembly of the modular support on the door frame.

The guide element may comprise a protrusion that extends from the surface of the panel, for example in a direction basically parallel to the longitudinal axis of the screw, or an edge that extends in said direction basically perpendicular to the longitudinal axis of the screw. This allows a simple implementation of the attachment unit, as the protrusion can be made simultaneously with the panel and form an integral part of it.

The guide element can have an elongated cross section, which can simplify its operative union to the screw.

The nut can comprise a plate (which may run flat along a direction substantially perpendicular to the longitudinal axis of the screw) with a threaded part that receives the threaded part of the screw, said plate being provided at a first end with an indentation in which the guide element is engaged. The indentation may be shaped so that the guide element will be engaged in said indentation by pressure. For example, the indentation can have a "V", "U" or similar shape in which the guide element is engaged by pressure. This can be particularly simple in the case of a guide element or protrusion with an elongated section whose width diminishes at the ends of its cross section (or at least at the end that is inserted in the nut). Pressure coupling can be practical as it allows to establish a position of the screw distant from the panel, so that the screw+ nut assembly will not move accidentally, which will simplify the assembly of the modular support on a door frame. In addition, according to the invention, this can be achieved without the need for additional moving parts.

The nut plate can have a second end curved in a direction opposite to the panel surface to facilitate placing the panel on a coupling edge of a door frame, so that said coupling edge is placed between the surface of the panel and said plate. The curved end can act as a "guide" for the coupling edge of the door frame.

The panel may comprise a plurality of reinforcement ribs around the orifice, in order to avoid the breakage of the orifice when the screw is tightened or during the lifetime of the door.

The panel can be made of plastic or metal. As mentioned above, the guide element can consist of a protrusion that is formed together with the panel, for example in an injection process or the like. However, it is also possible for the guide element to be a separate element joined to the panel by any attachment means.

The screw and the nut can be made of any suitable material, such as a metal.

The modular support can include one or more door accessories, such as a lock, one or more window lift rails, one or more loudspeakers and/or a peripheral sealing gasket, etc.

Another aspect of the invention relates to a door assembly for an automobile that comprises a modular support as described above and a door frame. The frame can comprise, in correspondence with at least one coupling edge of the frame a plurality of indentations, each one shaped to receive a screw of an attachment unit of the modular support. The indentations can have a width that tapers down away from the edge, and/or can have an inner or lower part that has another notch with a width similar to the diameter of the screw, so that said notches allow the corresponding screw to be self-centred.

The door frame can have a plurality of through orifices sized so that each one allows passage of a screw and a guide element of an attachment unit of the modular support. These orifices can also have self-centering means, a lower notch with a width that corresponds to the diameter of the screw.

Another aspect of the invention relates to a method for assembling a modular support in accordance with the above description on a door frame that comprises a plurality of indentations in a coupling edge of the frame. The method comprises the following steps:

Placing the modular support with the screws of its attachment units placed in said indentations, so that the panel is on one side of the coupling edge and the nut is on the other side of the coupling edge; and Turning the screw so that the nut moves towards the panel along the guide element, until the coupling edge is pressed between the panel and the nt.

The method can also include a step that involves passing the guide elements and the nuts of other attachment units through orifices made in the door frame.

DESCRIPTION OF THE DRAWINGS

To complete the description and in order to aid a better understanding of the characteristics of the invention, according to an example of a preferred embodiment of the invention, a set of drawings is accompanied where for purposes of illustration and in a non-limiting manner the following is shown.

PREFERRED EMBODIMENT OF THE INVENTION

Figure 1:
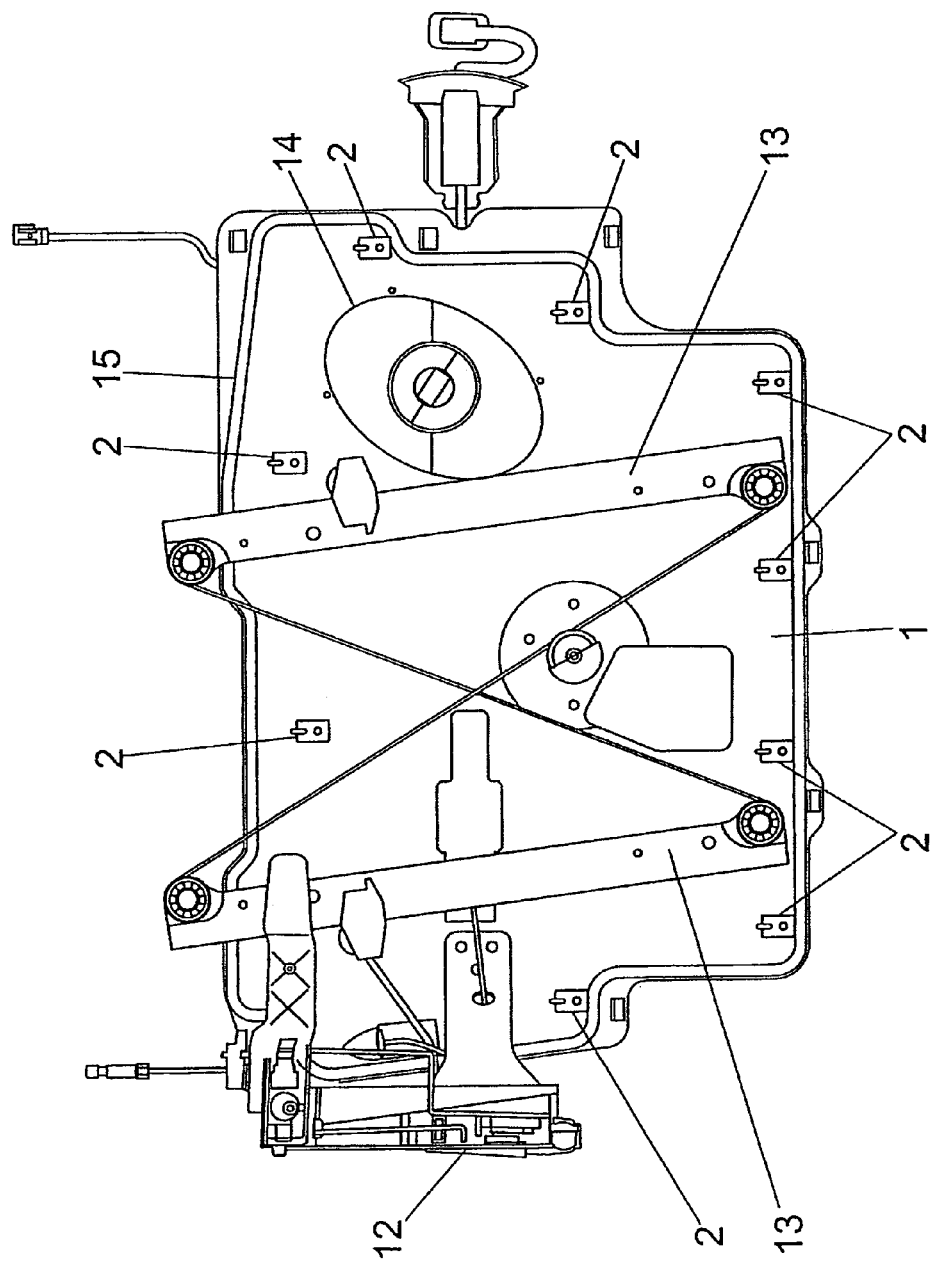
FIG. 1 shows a front elevation view of a modular support in accordance with a preferred embodiment of the invention.
Figure 2:
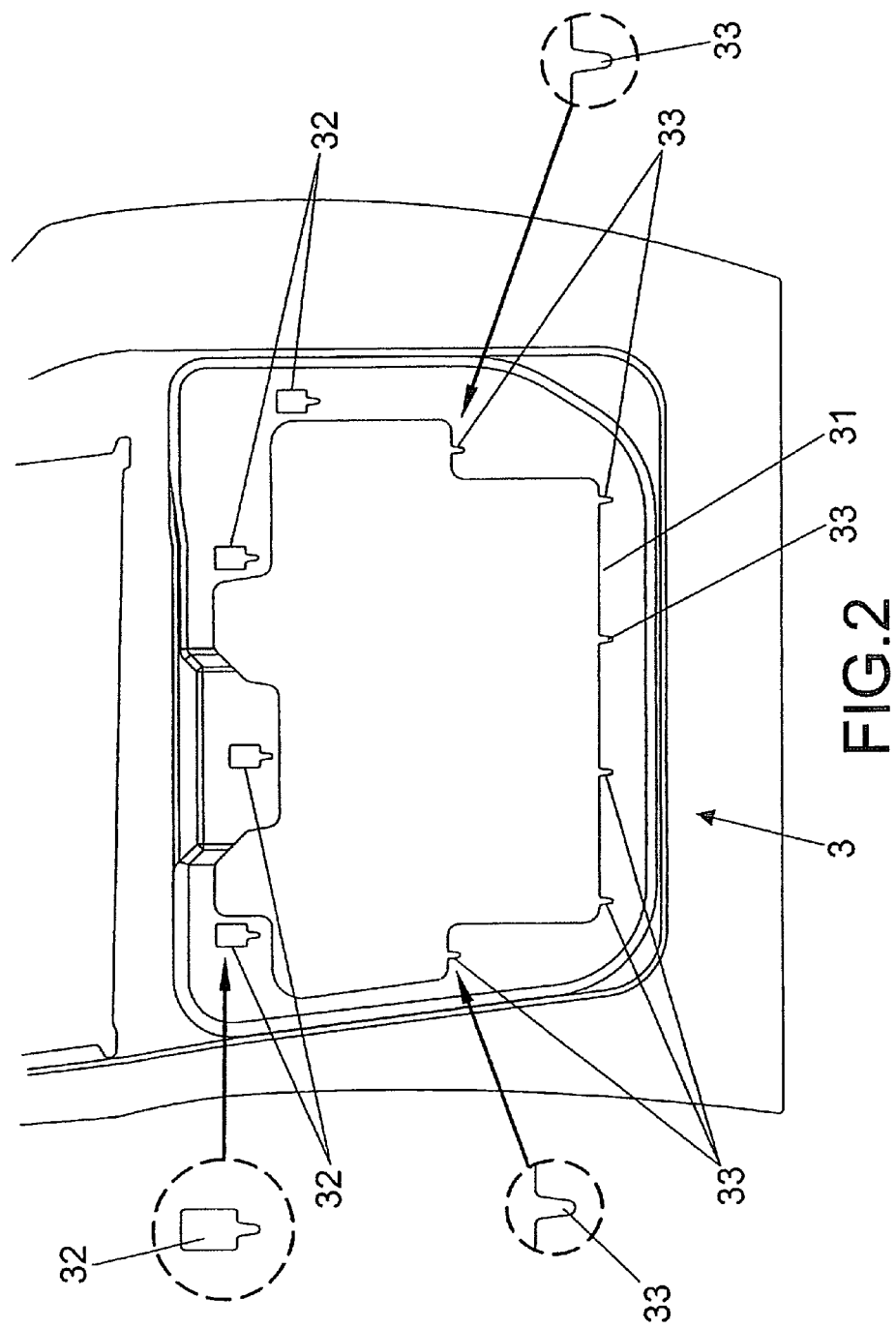
FIG. 2 shows a front elevation view of a door frame on which the modular support can be mounted.

FIG. 1 represents a modular support in accordance with a preferred embodiment of the invention. Mounted on a support panel 1 (made of plastic for example) are a plurality of accessories for an automobile door, in this specific example a lock 12, rails 13 of a window lift mechanism, a loudspeaker 14 and a peripheral sealing gasket 15. Also shown are a plurality of attachment units 2 mainly distributed along the perimeter of the panel 1. These attachment units allow to attach the modular support of FIG. 1 to a door frame 3 as that shown in FIG. 2, which is provided with a coupling edge 31 along which are distributed a plurality of indentations 33 and through orifices 32, in positions corresponding to the positions of the attachment units 2 of the modular support. This is, each attachment unit 2 has a corresponding indentation 33 or a through orifice 32 of the frame 3.

Figure 3:
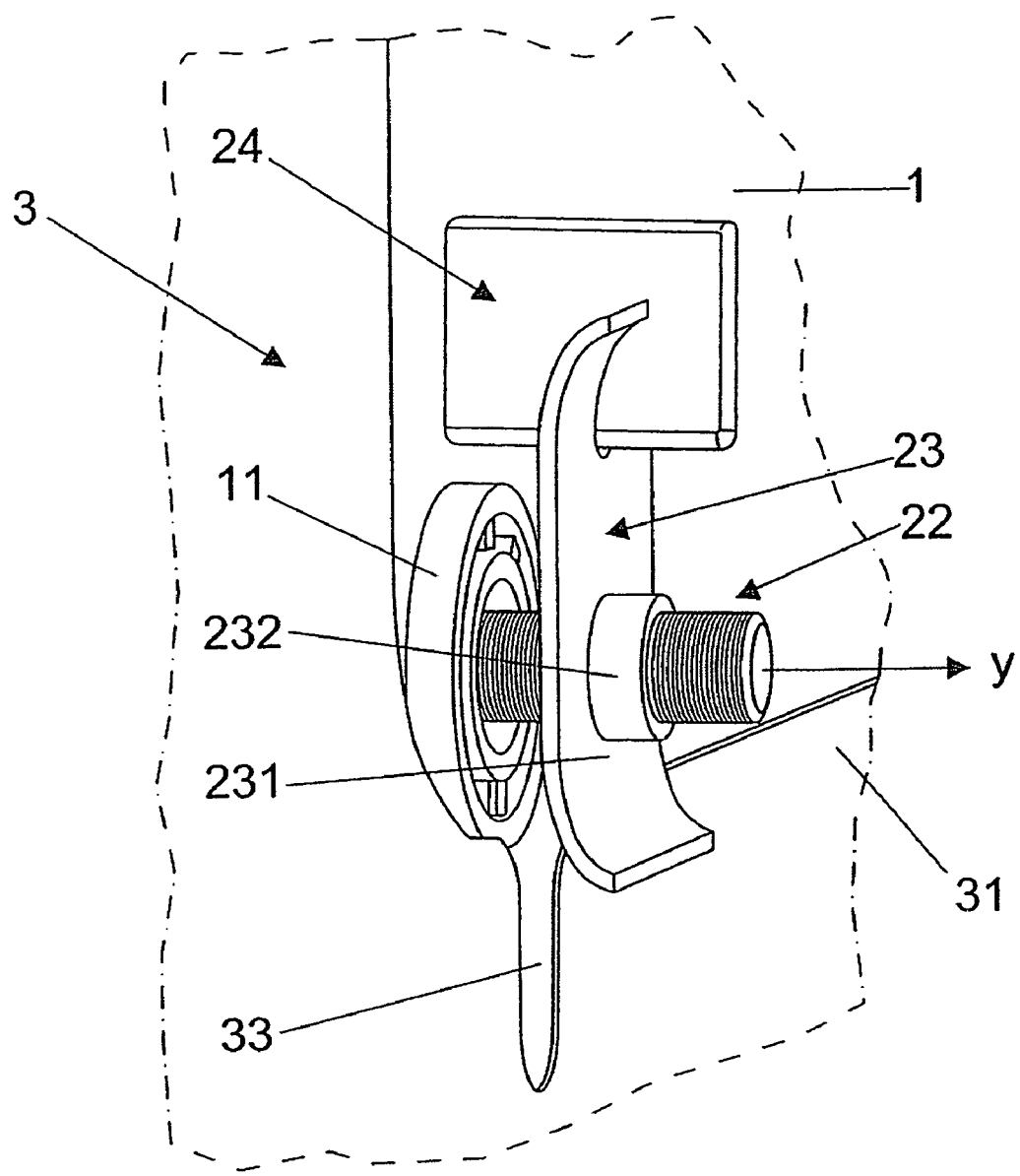
FIGS. 3-5 show schematic representations of an attachment unit according to a preferred embodiment of the invention.
Figure 4:
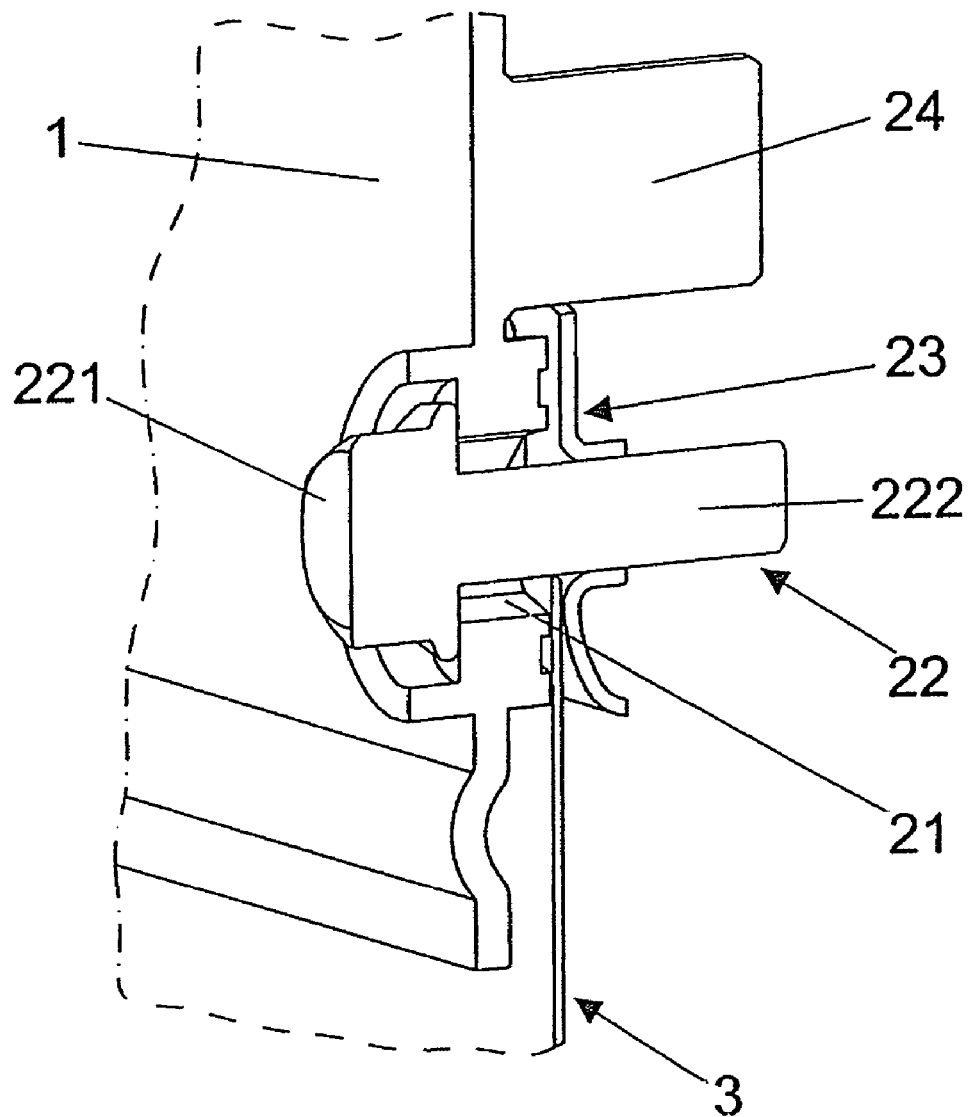
Figure 5:
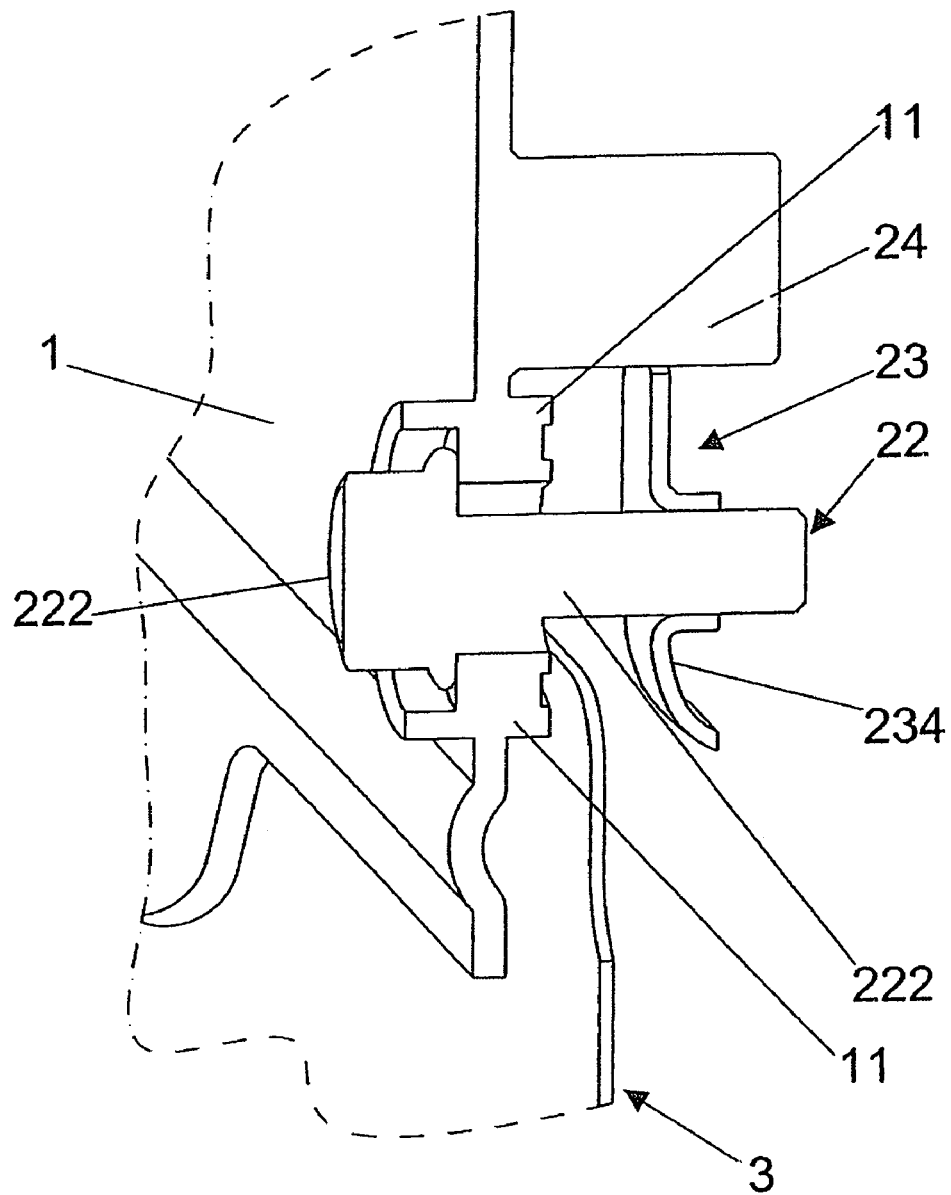

FIGS. 3-5 provide schematic representations of the attachment units 2. Specifically, FIG. 3 is a schematic representation of one part of the panel 1 with its attachment unit located in correspondence with an indentation 33 of the coupling edge 31 of the door frame. It can be seen that the attachment unit includes a screw 22 that passes through an orifice made in the panel, with a number or reinforcement ribs about said orifice. The screw 22 has a head 221 located on the other side of the orifice 21, as shown schematically in the FIGS. 4 and 5. During the assembly, the elongated part 22 of the screw is placed so that it rests on the indentation 33 made in the edge 31 of the door frame. Then the screw is turned so that its edge is trapped between the panel 1 (or more specifically between the reinforcement ribs 11 of the panel 1) and a nut 23 that forms part of the attachment unit and in which the screw 22 is threaded.

Figure 6:
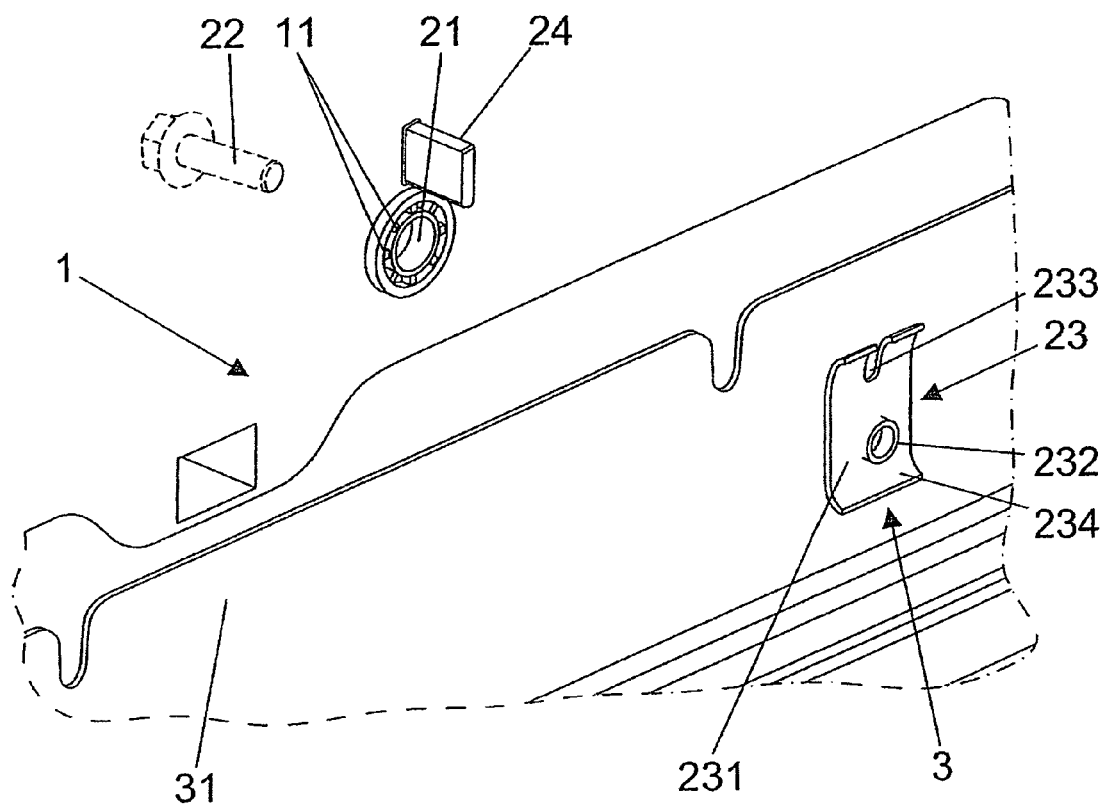
FIG. 6 shows a schematic perspective view of a detail of a modular support according to the invention and of a coupling edge of a door frame.

As can be seen in FIGS. 3-5 and in FIG. 6, the nut comprises a plate 231 with a threaded part 232 (which receives a threaded part of the screw 22). The plate 231 extends in a direction that is essentially perpendicular to the longitudinal axis "y" of the screw and on a first end has an approximately U-shaped configuration 233 (see FIG. 6). In addition, the plate has a second end 234, curved in a direction away from the panel 1, to facilitate the insertion of the coupling edge 31 between the plate 231 and the panel 1 during the assembly of the modular support to the frame 3.

The attachment unit also comprises a guide element 24 in the form of a protrusion (which can form part of the panel 1, in which case it can be made at the same time as the panel 1, for example in a mould injection phase) with an elongated cross section. This protrusion, which runs in a direction parallel to the longitudinal axis "y" of the screw 22, is inserted by pressure in the configuration 233 of the nut 23. In this way, in a stage prior to assembly on the frame the guide element 24 stops the screw from moving; the screw+nut assembly is coupled to the guide element by pressure, without requiring any attachment elements.

As can be clearly seen in FIGS. 3-6, the guide element does not allow the nut 23 to turn about the longitudinal axis of the screw 22. However, it allows the nut to move along said longitudinal axis in response to the turn of a screw and provided the force exerted on the nut in said direction exceeds the threshold required for the nut to slide along the guide element in which, at least initially, it is coupled by pressure.

Figure 7:
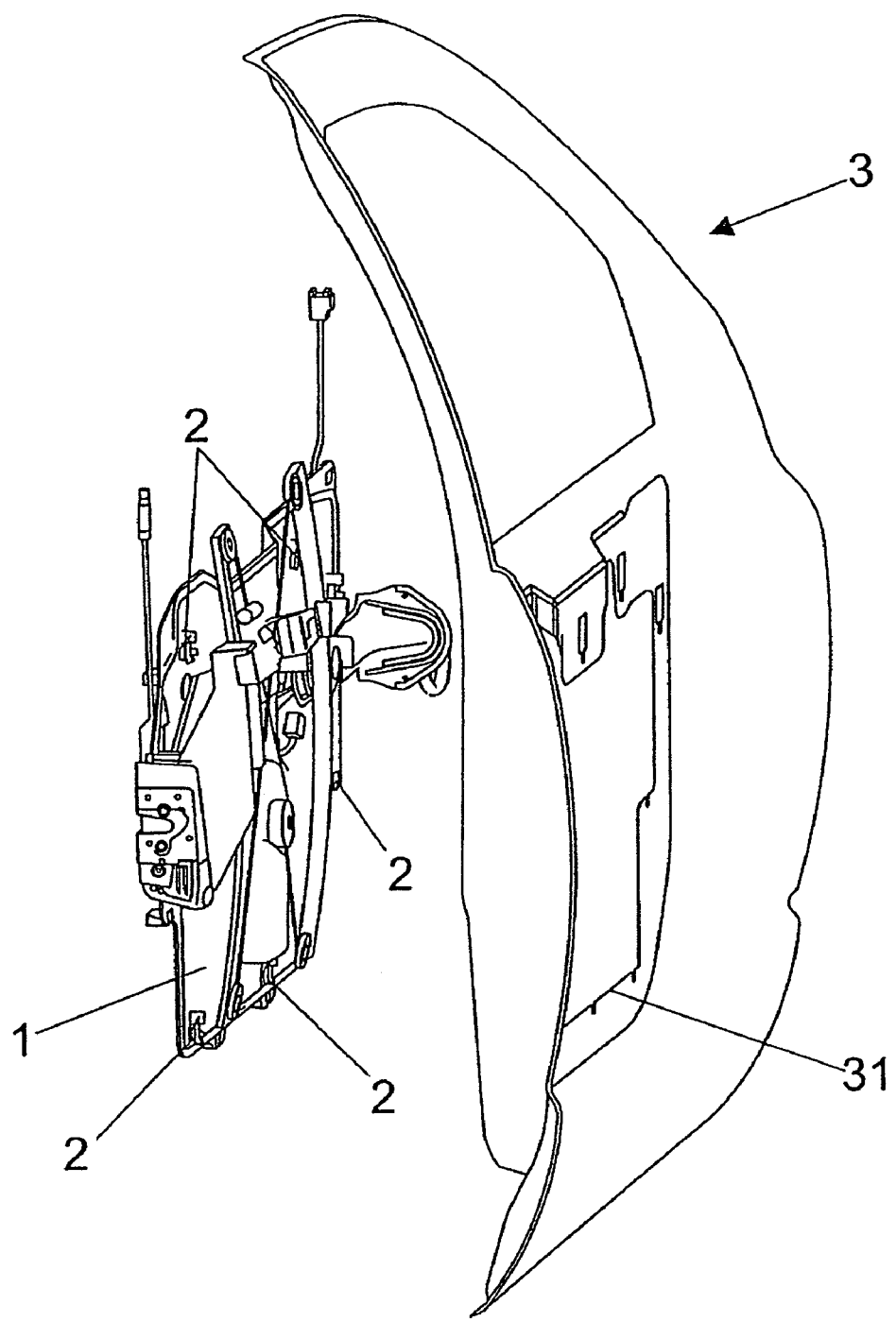
FIG. 7 shows a perspective view of a modular support and a door frame.
Figure 8:
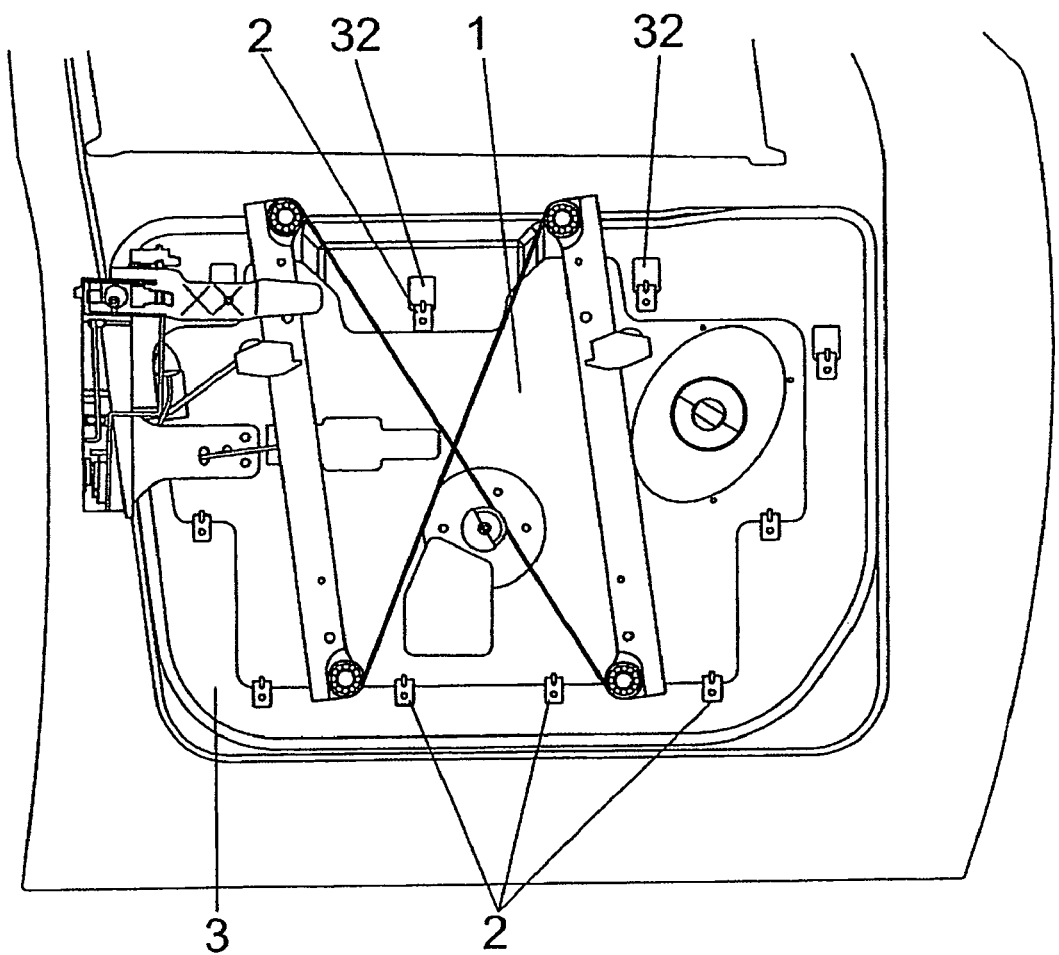
FIG. 8 shows an elevation view of a door assembly that comprises a modular support mounted on a door frame.

In this way, to attach the modular support to the door frame 3, the modular support is placed (see FIGS. 6 and 7) in correspondence with a large orifice of the frame defined by the coupling edge 31, and the modular support is move toward the frame so that the nut 23 and the guide element 24 of several attachment units enter the through orifices 32 of the frame 3, while the nuts 23 of the remaining attachment units are placed in correspondence with the corresponding indentations 33, with the nut 23 on one side of the edge 31 and the panel 1 on the other side of the edge. Then the modular support is lowered with respect to the frame 3, so that the screws 2 of the attachment units are placed on the narrowest and lower parts of the through orifices 32 and the indentations 33, respectively. In this way the modular support is self centred with respect to the frame.

In the next stage the worker tightens the screws, which can be done without having to hold the modular support to maintain its orientation with respect to the frame; this position is maintained because the screws are engaged in the narrowest, lower parts of the through orifices 32 and the indentations 33.

When the worker turns the screws the nuts are displaced towards the panel 1 so that the coupling edge is retained between the nut 23 and reinforcement ribs 11; during its displacement, the nut can slide along the protrusion or guide element 24.

In this text the term "to comprise" and all of its derivations (as "comprising", etc.) should not be understood in an excluding sense, this is, they do not exclude the possibility that what is described includes other elements, steps, etc.

In addition, the invention is not limited to the specific embodiments described, but instead also includes, for example, the variations that can be performed by an average expert in the field (such as regarding the choice of materials, dimensions, components, configurations, etc.), within the scope of the claims.

The invention claimed is:

1. Modular support for automobile doors comprises:
  a support panel configured for assembly on said panel of accessory elements of an automobile door; and
  at least one attachment unit for attaching the panel to a door frame;
  wherein said at least one attachment unit comprises:
    an orifice in the panel;
    a screw mounted on said panel that passes through the orifice of the panel, the screw being provided with a head placed on a first side of the orifice;
    a nut placed on a second side of the orifice, opposite the first side of the orifice, the screw being threaded in the nut; and
    a guide element that extends from a surface of the panel in correspondence with said second side of the orifice, said guide element being functionally related to the nut so that it the guide element allows a movement of the nut in a direction parallel to a longitudinal axis (y) of the screw and stops the nut from turning around said longitudinal axis (y) of the screw.

2. Modular support according to claim 1, wherein the guide element comprises a protrusion that extends from the surface of the panel.

3. Modular support according to claim 1, wherein the guide element has an elongated cross section.

4. Modular support according to claim 1, wherein the nut comprises a plate with a threaded part that receives a threaded part of the screw, said plate having on a first end an indentation in which the guide element is engaged.

5. Modular support according to claim 4, wherein said indentation is configured so that the guide element is inserted by pressure in said indentation.

6. Modular support according to claim 4, wherein said plate has a second end curved in a direction opposite to the surface of the panel, to facilitate placing the panel on a coupling edge of the door frame, so that said coupling edge is placed between the surface of the panel and said plate.

7. Modular support according to claim 1, wherein the panel further comprises a plurality of reinforcement ribs arranged around the orifice.

8. Modular support according to claim 1, wherein the panel is made of plastic.

9. Modular support according to claim 1, wherein the guide element is a protrusion that integrally forms part of the panel.

10. Modular support according to claim 1, further comprising a plurality of said attachment units, arranged along a perimeter of the panel.

11. Modular support according to claim 1, further comprising, mounted on the panel, at least one element selected from among a group of elements including: a lock; window lift rails; a loudspeaker; and a peripheral sealing gasket.

12. Door assembly for an automobile, comprising:
  a door frame; and
  a modular support, the modular support further comprising:
    a support panel configured for assembly on said panel of accessory elements of an automobile door; and
    at least one attachment unit for attaching the panel to the door frame;
    wherein said at least one attachment unit further comprises:
      an orifice in the panel;
      a screw mounted on said panel that passes through the orifice of the panel, the screw being provided with a head placed on a first side of the orifice;
      a nut placed on a second side of the orifice, opposite the first side of the orifice, the screw being threaded in the nut; and
      a guide element that extends from a surface of the panel in correspondence with said second side of the orifice, said guide element being functionally related to the nut so that the guide element allows a movement of the nut in a direction parallel to a longitudinal axis (y) of the screw and stops the nut from moving along said longitudinal axis (y) of the screw.

13. Door assembly according to claim 12, wherein the door frame further comprises, in correspondence with at least one coupling edge, a plurality of indentations configured to each receive a screw of an attachment unit of the modular support.

14. Door assembly according to claim 13, wherein said indentations have a width that tapers down away from the coupling edge so that said indentations allow self-centering of the corresponding screw.

15. Door assembly according to claim 12, wherein the door frame has a plurality of through orifices, each through orifice sized to allow passage of a nut and a guide element of an attachment unit of the modular support.

* * * * *